US012044699B2

(12) United States Patent
Stumpf

(10) Patent No.: US 12,044,699 B2
(45) Date of Patent: Jul. 23, 2024

(54) GROUND-BASED VECTORED THRUST SYSTEM

(71) Applicant: Fuelie Landing Systems, Inc., Lewes, DE (US)

(72) Inventor: Thomas R. Stumpf, Chapel Hill, NC (US)

(73) Assignee: Fuelie Landing Systems, Inc., Lewes, DE (US)

( * ) Notice: Subject to any disclaimer, the term of this patent is extended or adjusted under 35 U.S.C. 154(b) by 904 days.

(21) Appl. No.: 17/050,059

(22) PCT Filed: Apr. 23, 2019

(86) PCT No.: PCT/US2019/028684
§ 371 (c)(1),
(2) Date: Oct. 23, 2020

(87) PCT Pub. No.: WO2019/209804
PCT Pub. Date: Oct. 31, 2019

(65) Prior Publication Data
US 2021/0237863 A1 Aug. 5, 2021

Related U.S. Application Data

(60) Provisional application No. 62/661,952, filed on Apr. 24, 2018.

(51) Int. Cl.
*G01P 5/00* (2006.01)
*B64F 1/04* (2006.01)
*G01S 13/72* (2006.01)
*B64F 1/02* (2006.01)

(52) U.S. Cl.
CPC .................. *G01P 5/00* (2013.01); *B64F 1/04* (2013.01); *G01S 13/72* (2013.01); *B64F 1/02* (2013.01)

(58) Field of Classification Search
CPC ...... G01P 5/00; B64F 1/04; B64F 1/02; G01S 13/72
See application file for complete search history.

(56) References Cited

U.S. PATENT DOCUMENTS 3,055,212 A 9/1962 Mackey
3,285,535 A * 11/1966 Crowley .................. B60V 1/00
D12/5
4,116,056 A 9/1978 Bulychev et al.
(Continued)

FOREIGN PATENT DOCUMENTS

JP 2014065321 A 4/2014
KR 20120004402 U 6/2012

*Primary Examiner* — Tyler J Lee
*Assistant Examiner* — Yufeng Zhang
(74) *Attorney, Agent, or Firm* — COATS & BENNETT, PLLC

(57) ABSTRACT

A ground-based vectored thrust system for landings and take-off of vertical take-off and landing (VTOL) aircraft. The vectored thrust system provides an upward thrust on the VTOL aircraft when in proximity to the pad. The upward thrust can supplement the thrust system of the VTOL aircraft, or can be used exclusively to elevate the VTOL aircraft. A control unit can control one or more of the components of the vectored thrust system. The control unit can also be configured to take-over the flight of the VTOL aircraft when it is within a predetermined flight envelope of the pad.

13 Claims, 14 Drawing Sheets

(56) References Cited

U.S. PATENT DOCUMENTS

| | | |
|---|---|---|
| 5,429,324 A | 7/1995 | Lynn |
| 6,318,668 B1 | 11/2001 | Ulanoski et al. |
| 6,382,560 B1 | 5/2002 | Ow |
| 6,616,094 B2 | 9/2003 | Illingworth |
| 7,857,256 B2 | 12/2010 | Hatton |
| 8,393,564 B2 | 3/2013 | Kroo |
| 8,485,464 B2 | 7/2013 | Kroo |
| 8,733,690 B2 | 5/2014 | Bevirt et al. |
| 8,864,068 B1 | 10/2014 | Pasternak |
| 9,022,312 B2 | 5/2015 | Kosheleff |
| 9,242,738 B2 | 1/2016 | Kroo |
| 9,475,579 B2 | 10/2016 | Fredericks et al. |
| 9,862,486 B2 | 1/2018 | DeLorean |
| 9,889,928 B2 | 2/2018 | Salz |
| 2007/0017722 A1* | 1/2007 | St. Louis ............... B60V 1/04 180/116 |
| 2011/0168834 A1 | 7/2011 | Yoeli |
| 2016/0031555 A1 | 2/2016 | Bevirt et al. |
| 2016/0200436 A1 | 7/2016 | North et al. |
| 2016/0304194 A1 | 10/2016 | Bevirt et al. |
| 2017/0144776 A1 | 5/2017 | Fisher et al. |
| 2018/0044000 A1 | 2/2018 | Venturelli et al. |

\* cited by examiner

GROUND-BASED VECTORED THRUST SYSTEM

RELATED APPLICATIONS

This claims priority to U.S. Provisional Application No. 62/661,952, filed Apr. 24, 2018, the disclosure of which is incorporated herein by reference in its entirety.

BACKGROUND

A vertical take-off and landing (VTOL) aircraft is one that can hover, take off, and land vertically. VTOL aircraft can be operated without use of an air strip as they can simply move vertically directly upward from a pad during take-off and move vertically downward onto a pad during landing. VTOL aircraft include one or more thrust-producing elements that include a blade or rotor to produce a thrust. These thrust-producing elements can be powered and oriented as necessary to lift, hover, and land the VTOL aircraft during flight.

There have been many improvements in VTOL aircraft. These improvements have concentrated on components and technologies that are included on the VTOL aircraft. Examples include more efficient and powerful thrust-producing elements, movable components that can be re-oriented during flight to provide the different lift, hover, and land requirements, and improved aircraft components.

The thrust capabilities of the VTOL aircraft are often maximized during take-off and landing. The thrust-producing elements are required to operate at higher levels during these times than during flight. As a result, the thrust-producing elements can become worn during these times of flight. Further, damage from high-level operation and stress is more likely to occur during these times.

To meet the high thrust requirements during take-off and landing, the thrust-producing elements can be designed to operate at the elevated thrust levels. However, this can add weight to the aircraft which reduces lift and can limit flight time, payload amounts, flight distance, and other flight parameters.

SUMMARY

One aspect is directed to a ground-based vectored thrust system for a VTOL aircraft. The system includes one or more ground-based thrust producing devices that emit air upward towards the VTOL aircraft. A thrust directing system includes one or more actuators and support arms that are operatively connected to the one or more ground-based thrust producing devices. The thrust directing system configured to selectively position the one or more ground-based thrust producing devices to emit air towards the VTOL aircraft. A control unit includes a processing circuit that controls the one or more ground-based thrust producing devices and the thrust directing system to apply an upward force on the VTOL aircraft to elevate the VTOL aircraft.

One aspect is directed to a method of controlling a VTOL aircraft. The method includes: activating one or more ground-based thrust producing devices and directing an output of air towards the VTOL aircraft; maintaining the one or more ground-based thrust producing devices directed towards the VTOL aircraft as the VTOL aircraft is within an envelope that extends outward from a pad; and deactivating the one or more ground-based thrust producing devices after the VTOL aircraft either contacts the pad or moves outside of the envelope.

One aspect is directed to a method of controlling a VTOL aircraft. The method includes: calculating a thrust to elevate the VTOL aircraft from a pad; activating and controlling one or more ground-based thrust producing devices and one or more thrust producing devices on the VTOL aircraft and elevating the VTOL aircraft; tracking the position of the VTOL aircraft as it moves from the pad; adjusting the output and orientation of at least the one or more ground-based thrust producing devices to maintain the VTOL aircraft elevated as it moves away from the pad; and determining that the VTOL aircraft has moved beyond an envelope of the pad and transferring control of the VTOL thrust producing devices to the VTOL aircraft.

One aspect includes a ground-based vectored thrust system for a VTOL aircraft. The system includes one or more ground based thrust producing devices that emit air upward towards the VTOL aircraft. A thrust directing system selectively positions the one or more thrust producing devices to emit air toward the VTOL aircraft. A control unit that includes a processing circuit controls the one or more thrust producing devices and the thrust directing system to apply an upward force on the VTOL aircraft to elevate the VTOL aircraft.

In at least one aspect, at least one of the thrust producing devices includes a fan with a blade.

In at least one aspect, sensors are positioned at the pad to detect an environmental condition at the pad and signal the control unit.

One aspect includes a method of landing a VTOL aircraft at a pad. The method includes activating one or more ground based thrust producing devices and directing the output at the VTOL aircraft to elevate an incoming VTOL aircraft; maintaining the thrust producing devices directed towards the VTOL aircraft as the VTOL aircraft approaches the pad; and deactivating the thrust producing devices after the VTOL aircraft contacts the pad.

In at least one aspect, the method also includes determining that the VTOL aircraft is within an envelope of the pad prior to activating the one or more thrust producing devices.

In at least one aspect, the method includes activating the one or more thrust producing devices prior to determining that the VTOL aircraft is within the envelope.

In at least one aspect, the method also includes taking control of the VTOL aircraft and controlling a thrust producing device on the VTOL aircraft while the VTOL aircraft is elevated above the pad.

In at least one aspect, the method includes using both the one or more thrust producing devices on the ground and one or more thrust devices on the VTOL aircraft and elevating the VTOL aircraft above the pad.

In at least one aspect, the method includes using just the one or more thrust producing devices at the pad and elevating the VTOL aircraft above the pad.

In at least one aspect, the method includes sensing a wind speed at the pad and adjusting the output of the one or more thrust producing devices.

In at least one aspect, the method includes using radar and tracking a position of the VTOL aircraft while approaching the pad.

One aspect is directed to a method of landing a VTOL aircraft at a pad. The method includes: determining that the VTOL aircraft is within an envelope of the pad; taking control of the VTOL aircraft; elevating the VTOL aircraft using at least one or more ground-based thrust producing devices; maintaining the one or more ground-based thrust producing devices directed towards the VTOL aircraft and landing the VTOL aircraft at the pad.

In at least one aspect, the method includes reducing an output of the one or more ground-based thrust producing devices as the VTOL aircraft approaches the pad.

In at least one aspect, the method includes activating one or more thrust devices on the VTOL aircraft and elevating the VTOL aircraft using the one or more thrust devices and one or more ground-based thrust producing devices.

One aspect is directed to a method of taking off a VTOL aircraft from a pad. The method includes: calculating a thrust to elevate the VTOL aircraft from the pad; activating one or more ground-based thrust producing devices and elevating the VTOL aircraft; tracking the position of the VTOL aircraft as it moves from the pad; and adjusting the output and orientation of the one or more ground-based thrust producing devices to maintain the VTOL aircraft elevating as it moves away from the pad.

In at least one aspect, the method includes determining that the VTOL aircraft has moved beyond an envelope and deactivating the one or more ground-based thrust producing devices.

In at least one aspect, the method includes controlling a thrust device on the VTOL aircraft and producing an upward force on the VTOL aircraft simultaneously with the thrust of the one or more ground-based thrust producing devices.

One aspect is directed to a method of taking off a VTOL aircraft from a pad. The method includes calculating a thrust to elevate the VTOL aircraft from the pad; activating one or more ground-based thrust producing devices and one or more VTOL thrust devices and elevating the VTOL aircraft; tracking the position of the VTOL aircraft as it moves from the pad; adjusting the output and orientation of the one or more ground-based thrust producing devices to maintain the VTOL aircraft elevated as it moves away from the pad; and determining that the VTOL aircraft has moved beyond an envelope and returning control of the VTOL thrust devices to the VTOL aircraft.

The various aspects of the various embodiments may be used alone or in any combination, as is desired.

DETAILED DESCRIPTION

The present application is directed to a ground-based vectored thrust system for landings and take-off of vertical take-off and landing (VTOL) aircraft. The vectored thrust system is ground-based at a pad for take-offs and landings of the VTOL aircraft. The vectored thrust system provides an upward thrust on the VTOL aircraft when in proximity to the pad. The upward thrust can supplement the thrust system of the VTOL aircraft, or can be used exclusively to elevate the VTOL aircraft. A control unit can control one or more of the components of the vectored thrust system. The control unit can also be configured to take-over the flight of the VTOL aircraft when it is within a predetermined flight envelope of the pad.

Figure 1:
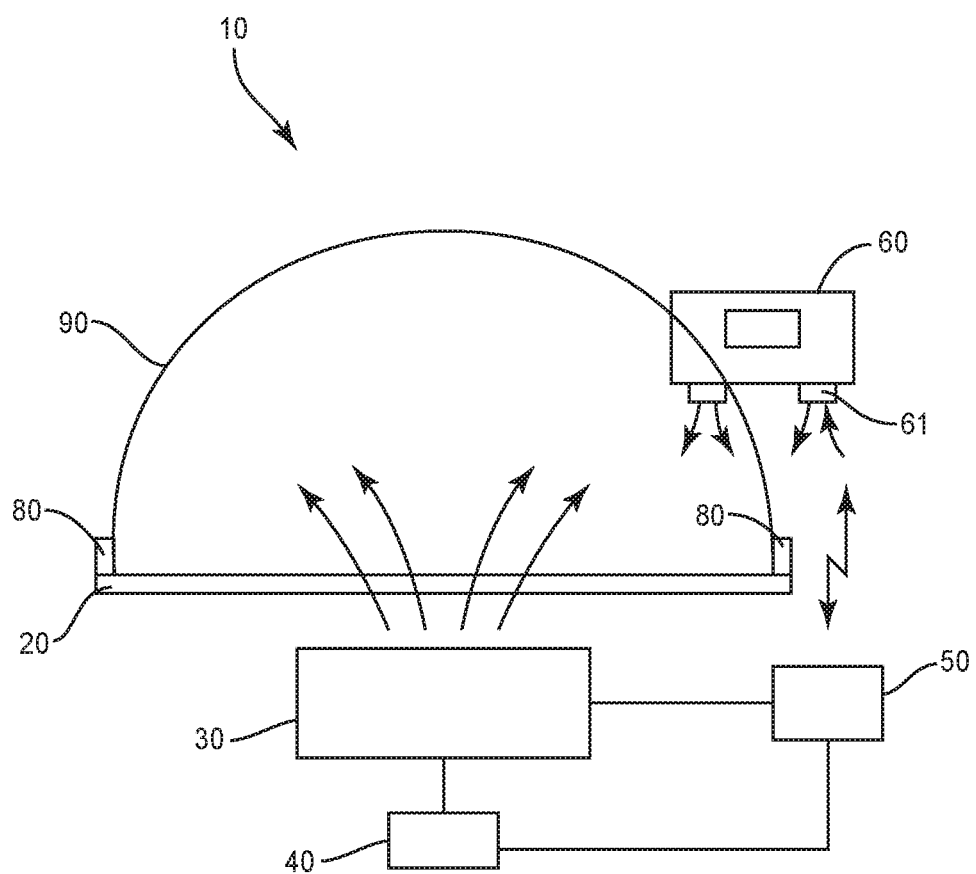
FIG. 1 is a schematic view of a VTOL aircraft within an envelope of a vectored thrust system.

FIG. 1 schematically illustrates a vectored thrust system 10 for use with a VTOL aircraft 60. The vectored thrust system 10 includes a pad 20 sized for landing and take-off of a VTOL aircraft 60. A thrust system 30 is positioned at the pad 20 to provide an upward thrust of air to elevate the VTOL aircraft 60. A thrust directing system 40 controls the orientation of one or more components of the thrust system 30 relative to the pad 20. A control unit 50 controls the operations of the thrust system 30 and the thrust directing system 40. The control unit 50 also communicates with the VTOL aircraft 60 and can control the flight of the VTOL aircraft 60 when it is within a predetermined envelope 90 of the pad 20.

Figure 2:
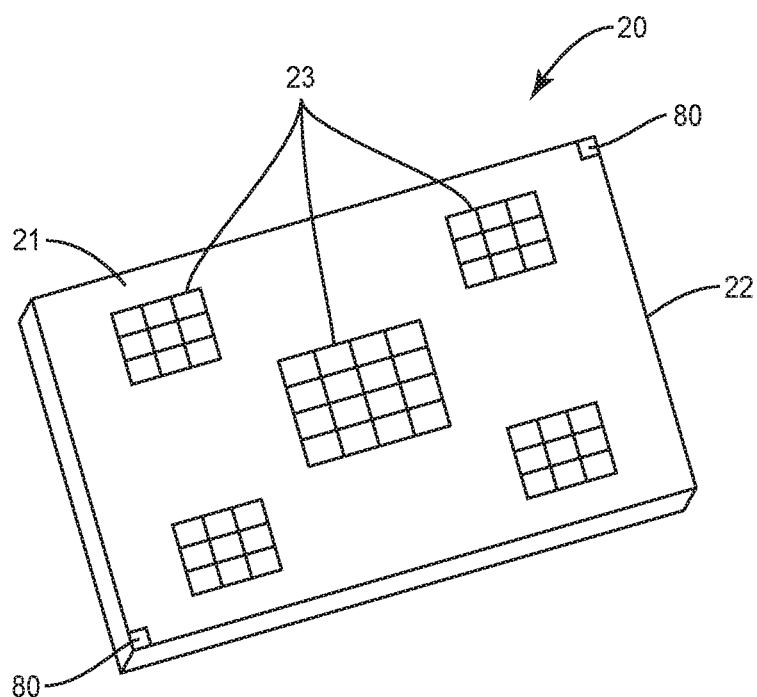
FIG. 2 is a perspective top view of a pad for landing and take-off and VTOL aircraft.

The pad 20 is sized for landing and take-off of one or more VTOL aircraft 60. As illustrated in FIG. 2, the pad 20 includes surface 21 that contacts and supports the VTOL aircraft 60. The pad 20 includes an outer perimeter 22 that can include various shapes and sizes with FIG. 2 specifically including a rectangular shape. The pad 20 can be constructed from various materials, including but not limited to concrete, asphalt, and metal. The pad 20 can be located at a fixed position, such as an airport, building, or hospital. The pad 20 can also be located on a vehicle that is configured to move, such as a ship and a portable fuel storage unit. One or more grates 23 can be positioned within the outer perimeter 22. The grates 23 provide an outlet for the airflow from the thrust system 30.

Figure 3:
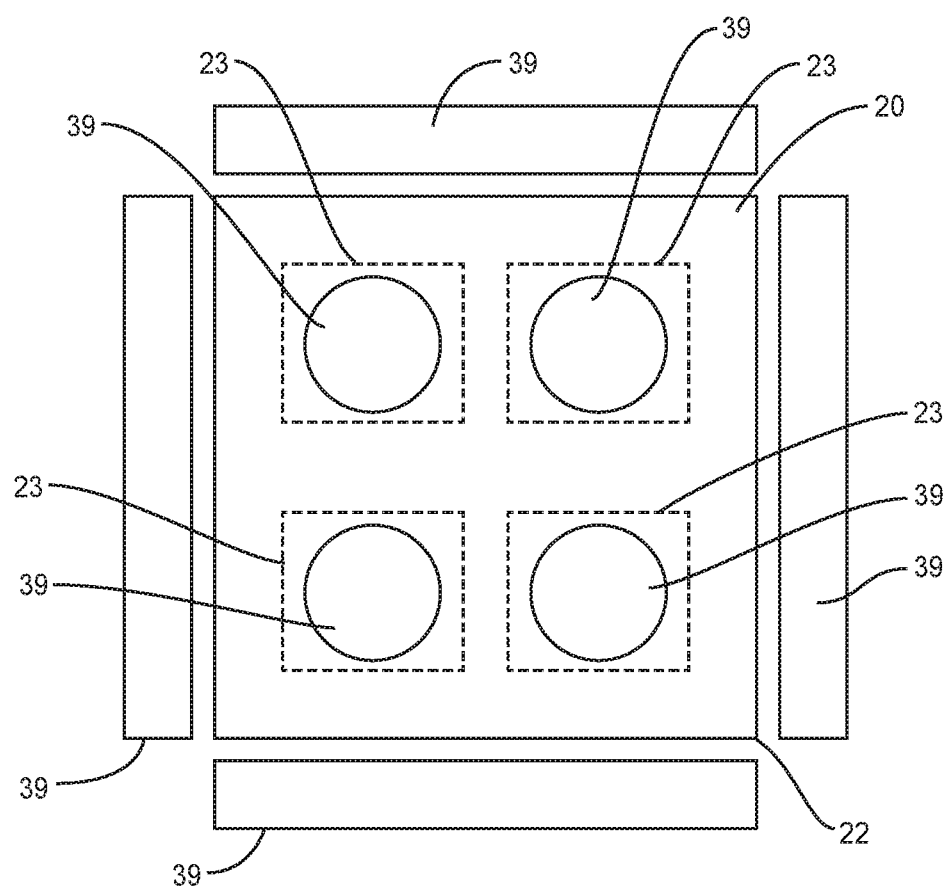
FIG. 3 is a top schematic view of a pad and a thrust system.

The thrust system 30 includes one or more thrust-producing devices 39 configured to produce an upward flow of air to elevate the VTOL aircraft 60. As illustrated in FIG. 3, the thrust-producing devices 39 can be located at various positions relative to the pad 20. This can include along one or more of the perimeter edges 22, and within the perimeter edge 22 and aligned with one or more grates 23.

Figure 4:
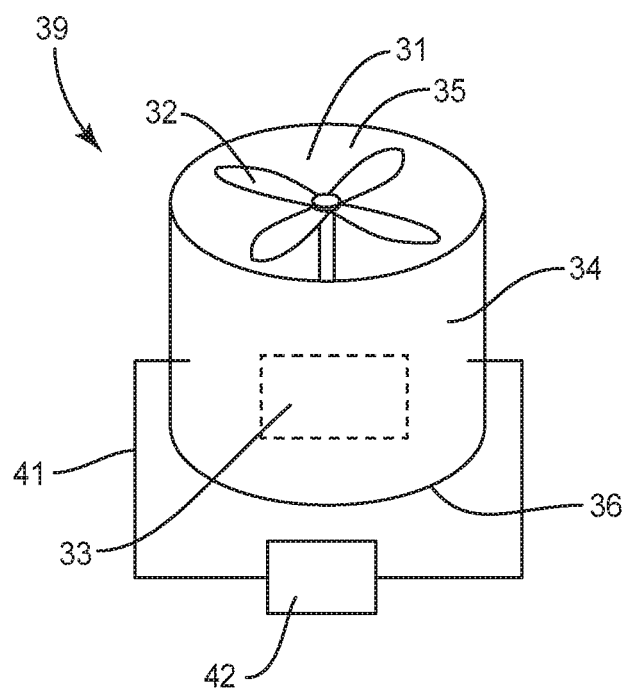
FIG. 4 is a perspective view of a thrust-producing device and components of a thrust-directing system.

FIG. 4 illustrates a thrust-producing device 39 that includes a fan 31 with one or more blades 32 that are rotated by one or more motors 33. The one or more blades 32 are positioned with a cylindrical shroud 34 such as a duct that includes closed side walls and an open outlet 35 and inlet 36. Air is drawn in through the inlet 36 and expelled from the outlet 35.

Figure 5:
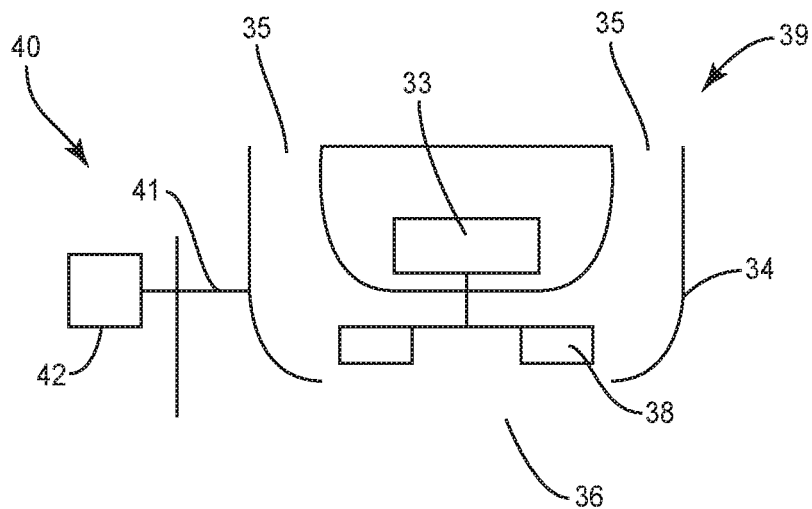
FIG. 5 is a schematic side view of a thrust-producing device and components of a thrust-directing system.
Figure 6:
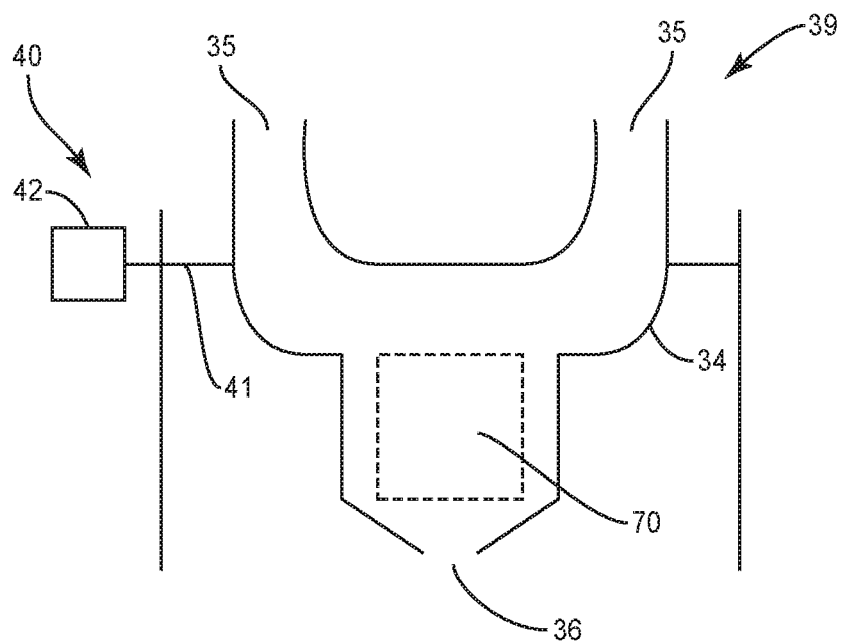
FIG. 6 is a schematic side view of a thrust-producing device and components of a thrust-directing system.
Figure 7:
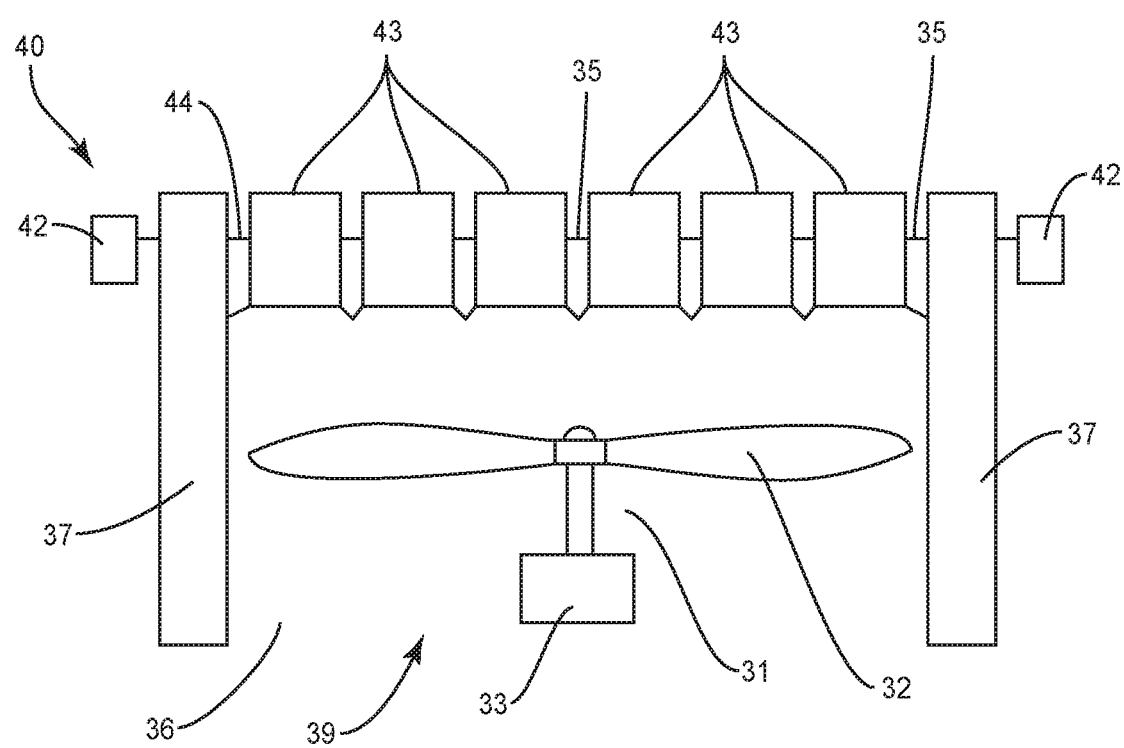
FIG. 7 is a side schematic view of a thrust-producing device and components of a thrust-directing system.

FIG. 5 illustrates a thrust-producing element 39 that includes a centrifugal pump with an impeller 38 that is rotated by a motor 33. Air is moved into the inlet 36 by the impeller 38 and then exits through the outlets 35 contained within the outer shroud 34. FIG. 6 illustrates a thrust-producing device 39 that includes a gas turbine engine 70 that pulls air in through an inlet 36 and ejects it at a much higher rate through outlets 35 within the outer shroud 34. FIG. 7 illustrates a thrust-producing device 39 that includes a single fan 31 sized to pull in air through an inlet 36 and expel it through an outlet 35.

The various thrust-producing devices 39 each operate to eject air upwards that cause an upward thrust, or lift, on the VTOL aircraft 60. The thrust equals the volume of expelled gas times the gas density times the gas speed. The thrust system 30 can include one or more thrust-producing devices 39. In a thrust system 30 with multiple thrust-producing devices 39, the devices 39 can be the same or different. Further, the devices 39 can each include the same or different sizes and shapes. The thrust-producing devices 39 operate through signals received from the control unit 50.

The vectored-thrust system 10 also includes a thrust-directing system 40 to position each of the thrust-producing devices 39. The thrust-directing system 40 can individually move one or more of the thrust-producing devices 39, or can move two or more of the devices 39 together as a unit. The thrust-directing system 40 can adjust the position of the one or more thrust-producing devices 39 and/or the position of the one or more outlets 35 through which the air is expelled. The thrust-directing system 40 can provide for the air from each of the thrust-producing devices 39 to be directed in a common direction or in two or more different directions.

FIG. 4 illustrates the thrust-directing system 40 configured to move each of the thrust-producing devices 39. FIG. 4 illustrates support arms 41 connected to the shroud 34 of each thrust-producing device 39. The support arms 41 are connected to an actuator 42 that adjusts the position of the support arms 41 to align the direction that air is expelled from the fan 31. FIGS. 5 and 6 illustrate similar arrangements with support arms 41 connected to the outer shroud 34 of each thrust-producing device 39. An actuator 42 can rotate the support arms 41 to direct the emitted air.

FIG. 7 illustrates a series of vanes 43 connected along a rod 44 that is operatively controlled by one or more actuators 42. The actuators 42 control the orientation of the vanes 43 to direct the output of air. The vanes 43 can move as a single unit, or one or more of the vanes 43 can be independently movable from the other vanes 43. In this configuration, the thrust-producing device 39 remains in position with the vanes 43 moving to direct the outputted air.

The vanes 43 can also control the movement of the outputted air. The vanes 43 can reduce or eliminate "swirling" and instead provide for "straightened" air flow to the VTOL aircraft 60. Non-swirling airflow can be essential for maximizing static air pressure under the apparatus.

The actuators 42 can operate responsive to signals from a control unit 50. The actuators 42 can be powered by various methods, including but not limited to hydraulic, pneumatic, and electromagnetic energy.

Figure 8:
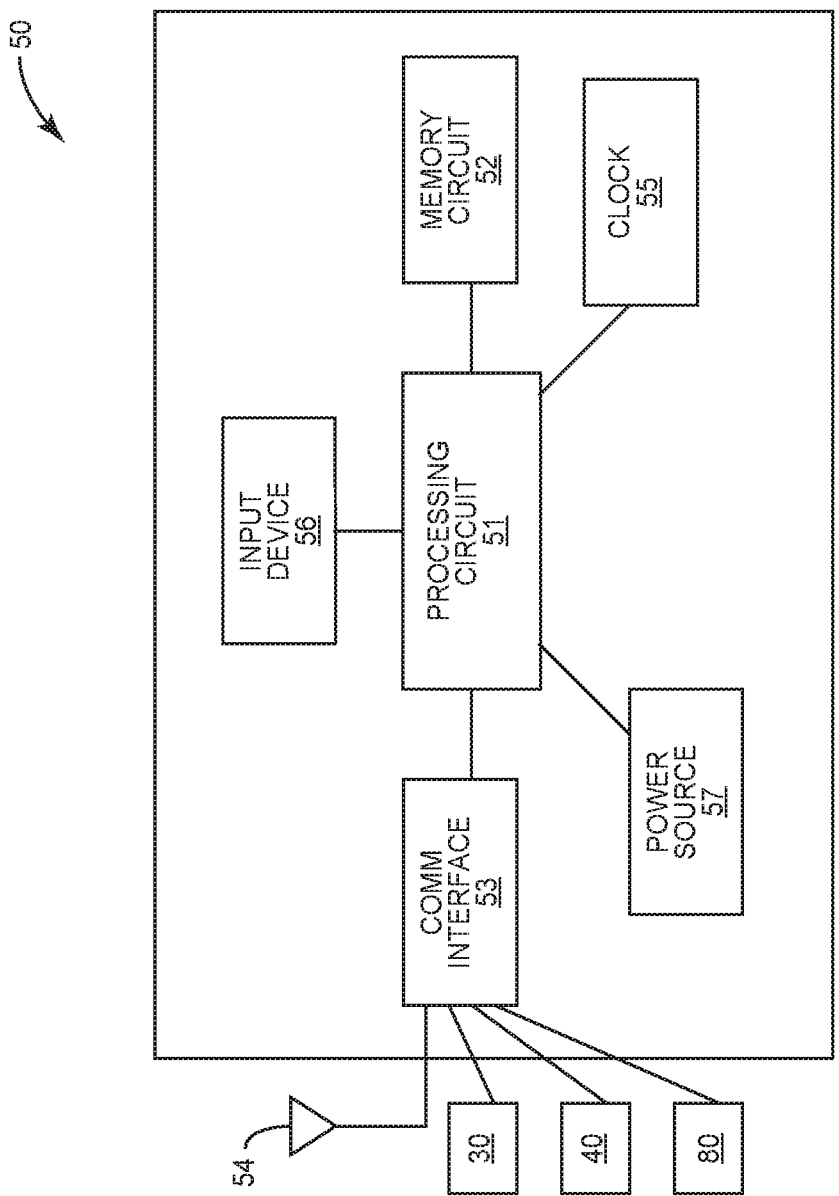
FIG. 8 is a schematic diagram of a control unit for a vectored thrust system.

A control unit 50 oversees the operation of the thrust system 30 and thrust directing system 40 as well as interaction with the VTOL aircraft 60. As illustrated in FIG. 8, the control unit 50 includes a processing circuit 51 that is communicatively coupled to one or more other components of the thrust system 30 and the thrust-directing system 40, e.g., via one or more buses. The processing circuit 51 can include one or more general-purpose and/or dedicated processors, including (but not limited to) one or more microprocessors, microcontrollers, application-specific integrated circuits (ASICs), field-programmable gate arrays (FPGAs), digital signal processors (DSPs), and/or other circuitry configured with appropriate software and/or firmware to control the various components according to program instructions stored in a memory circuit 52. The memory circuit 52 stores processing logic, programming code, and operational information for use by the processing circuit 51. The memory circuit 52 can include volatile memory, non-volatile memory, or both, according to various embodiments.

A communication interface 53 is configured to exchange signals with VTOL aircraft 60 as well as other components of the vectored thrust system 10. For example, the communication interface 53 can comprise an electronic transmitter for transmitting radio, electrical, and/or optical signals, and may further comprise an electronic receiver for receiving radio, electrical, and/or optical signals. The control unit 50 can include one or more internal and/or external antennas 54 to provide for the communication. The communication interface 53 can also be configured to support additional modes of communication. This can include support for short-range wireless signaling via BLUETOOTH, RFID, ZIGBEE, and/or WIFI, as well as long-range wireless communication via cellular- and/or satellite-based signaling. The communication interface 53 can additionally or alternatively be configured to support signaling over a wired connection, such as a serial, USB, micro USB, FIREWIRE, Lightning, and/or Thunderbolt connection.

The control unit 50 can also include a clock 55 is configured to measure various timing aspects of the vectored thrust system 10. An input device 56 such as a keypad, touchpad, touch-sensitive display screen, switch, dial, buttons, track-ball, etc. can be included to receive inputs from an operator. The control system 50 can include a separate power source 57 such as a battery (not illustrated) for powering one or more of the components. The control unit 50 can additionally or alternatively receive power from an external source. In one design, the control unit 50 is equipped with solar power capability that includes one or more solar panels that convert light to energy. The power can be harnessed and used to operate one or more components of the control unit 50.

The vectored control system 10 can include one or more sensors 80 to sense conditions at the pad 20. The sensors 80 send signals indicative of the sensed conditions to the control unit 50 for determining one or more operational settings.

A first type of sensor 80 detects the operational conditions of one or more components of the vectored thrust system 10. This can include but is not limited to a speed of the air moving from the outlet 35 of one or more thrust-producing devices 39, and the orientation of the air that is emitted from one or more thrust-producing devices 39.

A second type of sensor 80 detects the environmental conditions at the pad 20. This can include but is not limited to wind speed, temperature, and humidity. The sensors 80 can also detect the position of VTOL aircraft 60. This can include radar or other positioning-sensing technology.

The control unit 50 is configured to determine for each VTOL aircraft 60 an envelope 90 at the pad 20. The vectored thrust system 10 is configured to interact with the VTOL aircraft 60 once inside the envelope 90. The envelope 90 extends outward laterally and vertically from the pad 20. The control unit 50 can adjust the size of the envelope 90 depending upon various parameters, including but not limited to the VTOL aircraft 60 (e.g., size, weight, surface area), and wind speed at the pad 20. For example, a relatively large VTOL aircraft 60 can have a smaller envelope 90 than a smaller VTOL aircraft 60. Likewise, the envelope 90 can be smaller during times of little or no wind as opposed to high wind conditions.

Figure 9:
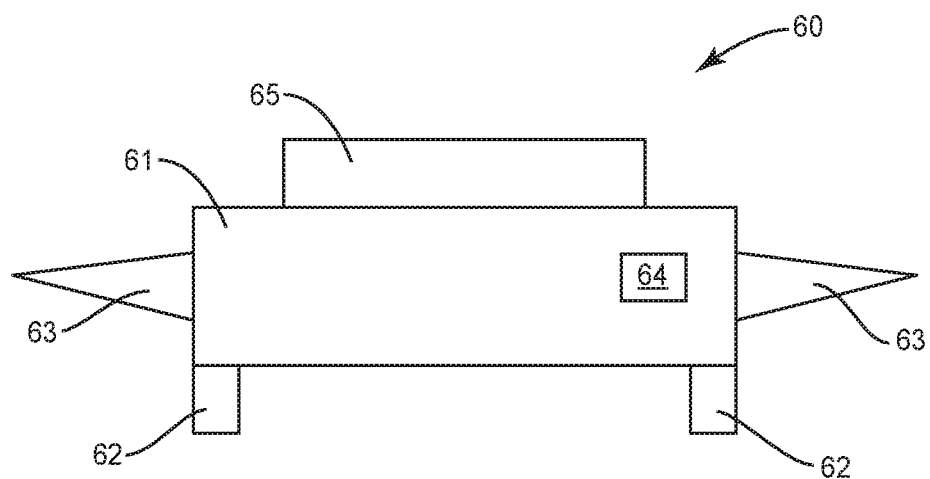
FIG. 9 is a schematic view of a VTOL aircraft.

FIG. 9 schematically illustrates a VTOL aircraft 60 applicable for use with vectored thrust system 10 during take-offs and landings. The VTOL aircraft 60 includes a body 61 that includes a surface area that is acted on by the air emitted from the vectored thrust system 10. A space 65 includes room for passengers and/or cargo. One or more thrust-producing devices 62 provide air thrust for flight. The thrust-producing devices 62 can include various designs that include various air-moving devices such as blades, impellers, etc. The thrust-producing devices 62 can further be powered by a variety of sources, such as internal combustion, turbo-fans, and turbo-shaft engines. One or more flight control members 63 provide for steering and controlling the VTOL aircraft 60 during flight. Flight control members 63 can include but are not limited to rudders, elevators, ailerons, wing leading and trailing edge devices, and spoilers.

Figure 10:
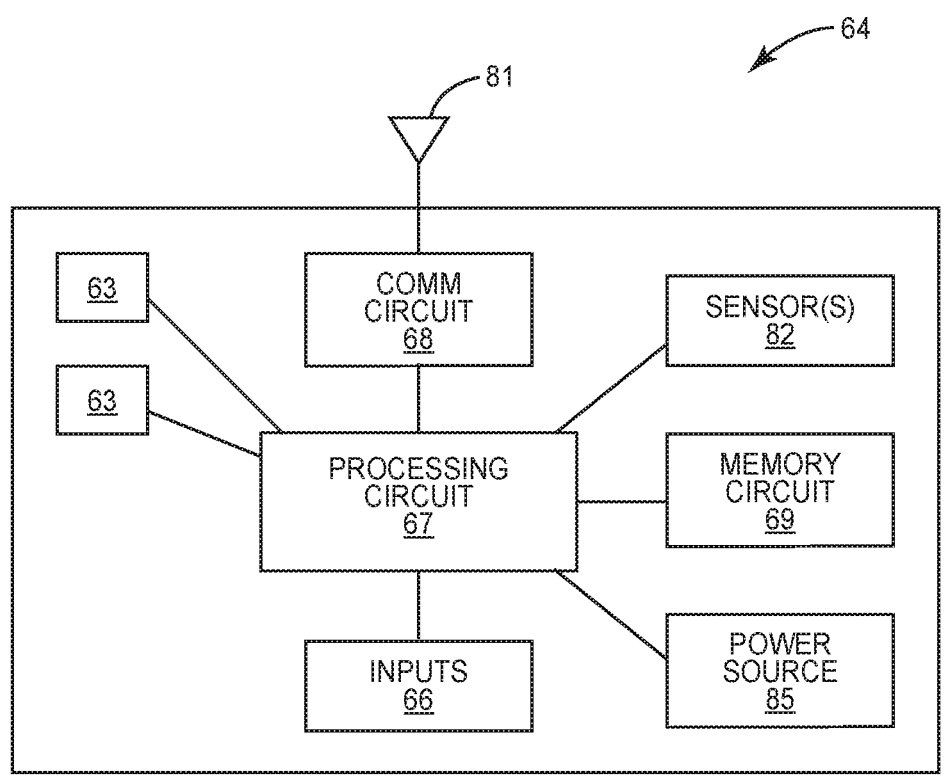
FIG. 10 is a schematic diagram of a control unit for a VTOL aircraft.

A control unit 64 controls the functioning of one or more of the components of the VTOL aircraft 60. FIG. 10 schematically illustrates a control unit 64. The control unit 64 includes a processing circuit 67 configured to operate the VTOL aircraft 60 during flight, such as by executing instructions stored in memory circuit 69. The processing circuit 67 can further receive signals from one or more input devices 66 to control one or more of the thrust-producing devices 62 and/or flight control members 63. The input devices 66 can include flight instruments that are operated by the pilot. Communication circuitry 68 (e.g., radio circuitry) is configured to transmit and/or receive information to and/or from the control unit 50 of the vectored thrust system 10, other aircraft, and various ground-based systems, e.g., via any communication technology. Such communication can occur via one or more antennas 81 that are either internal or external to the aircraft 60. The control unit 64 can also receive signals from one or more sensors 82 on the VTOL aircraft 60. The sensors 82 can detect one or more operational conditions of the VTOL aircraft 60, such as but not limited to output of the one or more thrust-producing devices 62, speed of the aircraft 60, and altitude of the aircraft 60. The sensors 82 can also detect one or more environmental conditions such as but not limited to wind speed, temperature, and humidity. A power source 85 can provide power to the processing circuit 67 and one or more of the components of the control unit 64.

The VTOL aircraft 60 can include a variety of different configurations. This includes but is not limited to manned and unmanned aircraft, manned spacecraft, unmanned spacecraft, satellites, rockets, missiles, and combinations thereof.

Figure 11:
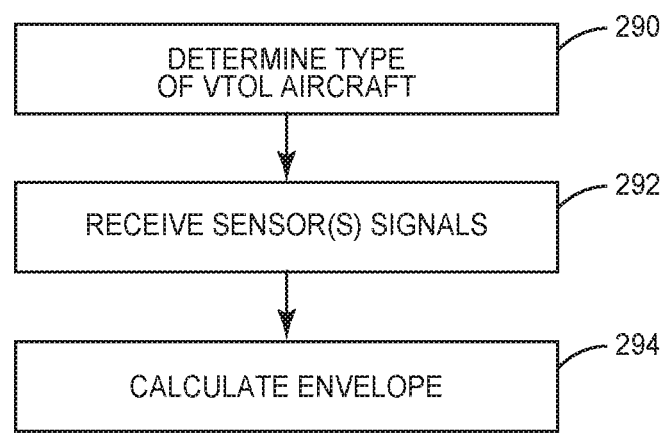
FIG. 11 is a flowchart diagram of a method of a method of calculating an envelope at a pad.

The control unit 50 of the vectored thrust system 10 can calculate the envelope 90 in which the VTOL aircraft 60 can be controlled. FIG. 11 illustrates a method of the control unit 50 calculating the envelope 90 at the pad 20 in which to control a VTOL aircraft 60. The control unit 50 determines the type of VTOL aircraft 60 (block 290). This can include obtaining specific information such as the specific model and year of manufacture. This can be obtained from pre-flight information that is input prior to a flight by the VTOL aircraft 60, or obtained from the approaching aircraft 60. The control unit 50 is able to detect operating parameters of the VTOL aircraft 60 based on this information, such as from a look-up table stored in the memory circuit 52 or from an accessed remote source. This information can provide the control unit 50 with information necessary to set the operating parameters of the vectored thrust system 10, such as the weight, shape, and size of the surface area of the VTOL aircraft 60. The control unit 50 can also receive signals from one or more sensors 80, 82 (block 292).

The control unit 50 is able to calculate the size and dimensions of the envelope 90 based on this information (block 294). The control unit 50 can calculate the envelope 90 one or more times. The envelope 90 can be regularly calculated to account for changes in the sensed parameters, such as wind speed at the VTOL aircraft 60 and/or pad 20.

Figure 12:
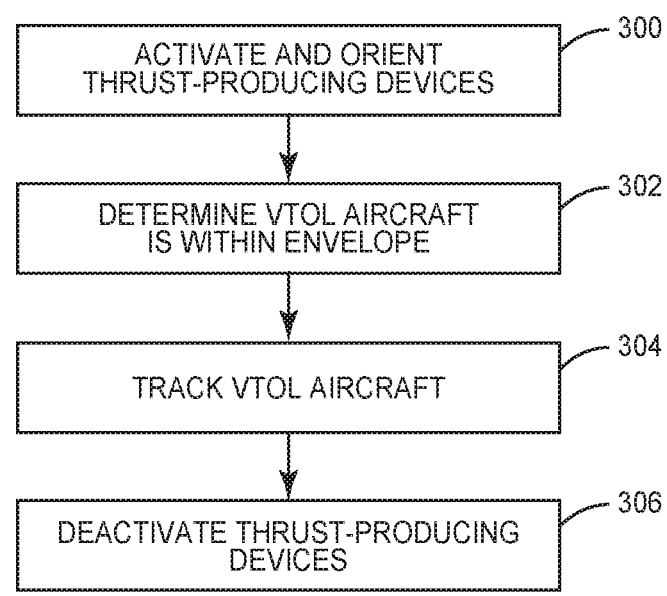
FIG. 12 is a flowchart diagram of a method of operating a vectored-thrust system for landing a VTOL aircraft at a pad.

FIG. 12 illustrates a method of the vectored-thrust system 10 assisting a VTOL aircraft 60 during landing. The control unit 50 determines that the VTOL aircraft 60 will be landing at the pad 20. This can occur prior to departure of the VTOL aircraft 60 from a current ground position (e.g., during pre-flight planning), or can occur based on a request received by the control unit 60 during flight of the VTOL aircraft 60. The control unit 50 determines the envelope 90 as disclosed above.

The control unit 50 monitors the location of the VTOL aircraft 60. At some point prior to entry into the envelope 90, the control unit 50 activates and orients the one or more thrust-producing devices 39 (block 300). The output of the thrust-producing devices 39 can be based on one or more factors such as type of VTOL aircraft 60 (e.g., weight and size) and wind speed. A larger VTOL aircraft 60 and/or high wind speeds can require additional thrust, with a smaller aircraft 60 requiring less thrust. The control unit 50 can also position the thrust-producing devices 39 towards the VTOL aircraft based on the tracked position.

The control unit 50 can ramp up the output of the thrust-producing devices 39 such that the output is at the required levels by the time the VTOL aircraft enters the envelope 90 (block 302). The control unit 50 continues to monitor the location of the VTOL aircraft 60 within the envelope 90. This provides for the thrust-producing devices 39 to remain directed at the VTOL aircraft 60 (block 304). The control unit 50 can also receive signals from the various sensors 80, 82 and adjust the output of the thrust-producing devices 39 accordingly. For example, a sensed wind gust can require a change in the amount of thrust (plus or minus) to maintain the level of the VTOL aircraft 60. Further, the amount of thrust can change based on the altitude of the VTOL aircraft 60.

The control unit 50 continues to apply the upward thrust on the VTOL aircraft 60 as it approaches and lands at the pad 20. The amount of thrust supplied by the thrust system 30 can be enough to elevate the VTOL aircraft 60 on its own. Alternatively, the amount of thrust supplied by the thrust system 30 can supplement the thrust supplied by the thrust-producing devices 62 of the VTOL aircraft 60.

Once the VTOL aircraft 60 is on the pad 20, the vectored thrust system 10 can be deactivated (block 306).

Figure 13:
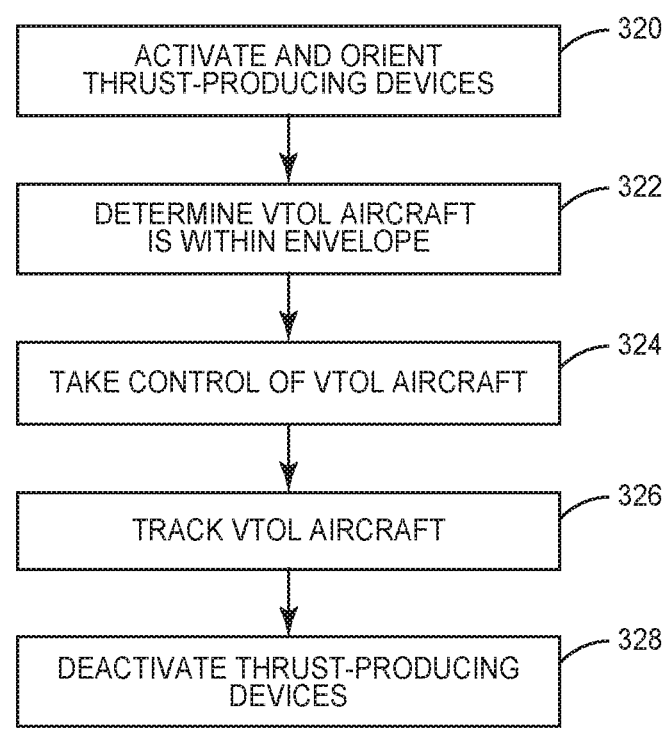
FIG. 13 is a flowchart diagram of a method of operating a vectored-thrust system for landing a VTOL aircraft at a pad.

FIG. 13 illustrates another method of providing upward thrust to a landing VTOL aircraft 60. The control unit 50 monitors the location of the VTOL aircraft 60. At some point prior to entry into the envelope 90, the control unit 50 activates and orients the one or more thrust-producing devices 39 (block 320). The control unit 50 can ramp up the output of the thrust-producing devices 39 such that the output is at the required levels by the time the VTOL aircraft 60 enters the envelope 90 (block 322).

The control unit 50 takes control of flight of the VTOL aircraft 60 upon entering into the envelope 90 (block 324). This can include control of the one or more thrust-producing devices 62 and flight control members 63. This can also include locking out or preventing the use of the one or more input devices 66. The control unit 50 further receives and/or has access to the signals from the sensors 82 indicating aspects of the flight of the VTOL aircraft 60.

Prior to taking control, the control unit 50 can signal a pilot of the VTOL aircraft 60 indicating the impending take-over. The control unit 50 can also instruct the pilot of an over-ride function that would allow for flight control to be returned to the VTOL aircraft 60. This could occur in the event of an emergency situation.

With control of the VTOL aircraft 60, the control unit 50 can adjust the outputs of the thrust-producing devices 39, 62 for flight of the aircraft 60. The control unit 50 further monitors the location of the VTOL aircraft 60 within the envelope 90 to maintain the orientation of the thrust system 30 (block 326).

The control unit 50 continues to apply the upward thrust on the VTOL aircraft 60 from one or both thrust-producing devices 39, 62 as the aircraft 60 approaches and lands at the pad 20. The amount of thrust supplied by the thrust system 30 can be enough to elevate the VTOL aircraft 60 on its own. Alternatively, the amount of thrust supplied by the thrust system 30 can supplement the thrust supplied by the thrust-producing devices 62 of the VTOL aircraft 60. Once the VTOL aircraft 60 is on the pad 20, the vectored thrust system 10 and the thrust-producing devices 62 of the VTOL aircraft 60 can be deactivated (block 328). Further, the control unit 50 can return control of the VTOL aircraft 60.

Figure 14:
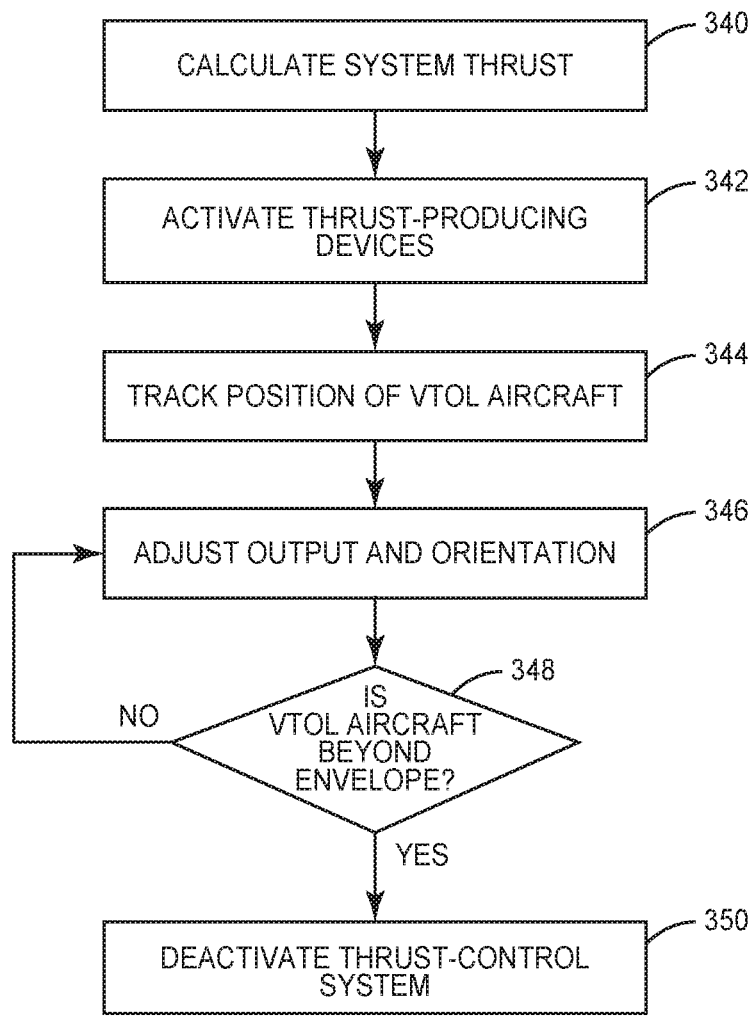
FIG. 14 is a flowchart diagram of a method of operating a vectored-thrust system for take-off of a VTOL aircraft from a pad.

The vectored thrust system 10 can also be used for take-off of VTOL aircraft 60 from the pad 20. FIG. 14 illustrates one method of the vectored-thrust system 10 used for a take-off.

The control unit 50 can calculate the amount of upward thrust needed from the vectored—thrust system 10 (block 340). This can be based on various inputs, including but not limited to the type of VTOL aircraft 60 (e.g., weight, size), wind speed, and temperature. With the VTOL aircraft 60 on the pad 20, the thrust-producing devices 39 are activated (block 342). The output of the thrust-producing devices 39 can be ramped up by varying amounts and sequences to the final output. The output can be an amount to independently elevate the VTOL aircraft 60, or can be a lesser amount that supplements the thrust provided by the thrust-producing devices 62 of the VTOL aircraft 60.

The control unit 50 tracks the location of the VTOL aircraft as it lifts off from the pad 20 (block 344). The control unit 50 can also adjust the output and orientation of the thrust-producing devices 39 to provide the needed upward thrust on the VTOL aircraft 60 (block 346).

The control unit 50 continues to provide an upward thrust while it is determined that the VTOL aircraft 60 is within the envelope 90 (block 348). Once the VTOL aircraft 60 has moved beyond the envelope 90, the vectored-thrust system 10 can be deactivated (block 350). In one design, the control unit 50 continues to monitor the position of the VTOL aircraft 60. In the event the control unit 50 determines a return to the pad 20, such as for an emergency situation, the control unit 50 can activate the thrust system 30 and thrust-directing system 40 to facilitate the landing.

Figure 15:
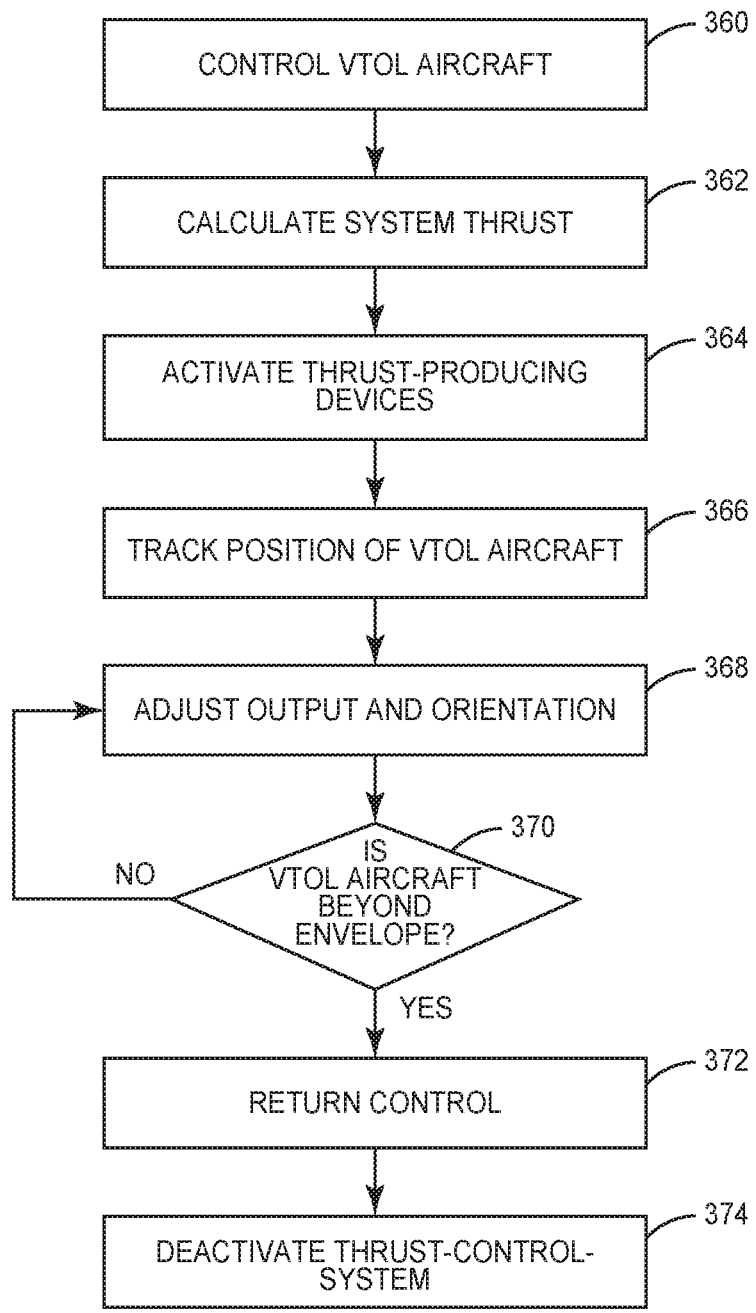
FIG. 15 is a flowchart diagram of a method of operating a vectored-thrust system for take-off of a VTOL aircraft from a pad.

FIG. 15 illustrates a method of the vectored-thrust system 10 used for a take-off in which the control unit 50 controls the VTOL aircraft 60 (block 360). The control includes control of the thrust-producing devices 62 and flight control members 63. Control also prevents operation of the input devices 66 on the VTOL aircraft 60. The control unit also calculates the amount of upward thrust needed from the vectored—thrust system 10 (block 362). This calculation can be performed before or after taking control of the VTOL aircraft 60. The thrust-producing devices 39 and/or 62 are activated (block 364) thus resulting in take-off of the VTOL aircraft 60 from the pad 20.

The control unit 50 tracks the location of the VTOL aircraft 60 as it lifts off from the pad 20 (block 366). The control unit 50 can also adjust the output and orientation of the thrust-producing devices 39/62 to provide the needed upward thrust on the VTOL aircraft 60 (block 368). The control unit 50 continues to control the flight of the VTOL aircraft 60 while it is within the envelope 90 (block 370). As the VTOL aircraft 60 approaches the envelope 90 or moves beyond the envelope 90, the control unit 50 returns control of the aircraft 60 (372). Prior to the return, the control unit 50 can query the VTOL aircraft 60 to ensure it is ready to take control. After the hand-off of the control, the control unit 50 can continue to monitor the position of the VTOL aircraft 60. In the event the control unit 50 determines a predetermined event (e.g., loss of altitude, erratic flight behavior), the control unit 50 can re-take control of the VTOL aircraft 60. In one design, the hand-off of control occurs while the VTOL aircraft 60 is within the envelope 90 to allow for the control unit 50 to retake control and fly the aircraft 60 in the event of a predetermined event.

After the take-off and the control unit 50 determines the VTOL aircraft 60 is flying adequately, the vectored-thrust system 10 can be deactivated (block 374).

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A method of controlling a VTOL aircraft, the method comprising:
   activating one or more ground-based thrust producing devices and directing an output of air towards the VTOL aircraft;
   maintaining the one or more ground-based thrust producing devices directed towards the VTOL aircraft as the VTOL aircraft is within an envelope that extends outward from a pad; and
   deactivating the one or more ground-based thrust producing devices after the VTOL aircraft either contacts the pad or moves outside of the envelope.

2. The method of claim 1, further comprising determining that the VTOL aircraft is within the envelope prior to activating the one or more ground-based thrust producing devices.

3. The method of claim 1, further comprising taking control of the VTOL aircraft and controlling a thrust producing device on the VTOL aircraft while the VTOL aircraft is elevated above the pad.

4. The method of claim 3, further comprising elevating the VTOL aircraft above the pad using both the one or more ground-based thrust producing devices and the one or more thrust producing devices on the VTOL aircraft.

5. The method of claim 1, further comprising sensing a wind speed at the pad and adjusting the output of the one or more ground-based thrust producing devices based on the wind speed.

6. The method of claim 1, further comprising using radar and tracking a position of the VTOL aircraft while the VTOL aircraft approaches the pad and prior to activating the one or more ground-based thrust producing devices.

7. The method of claim 1, further comprising:
determining that the VTOL aircraft is within the envelope of the pad;
taking control of the VTOL aircraft when the VTOL aircraft is within the envelope;
elevating the VTOL aircraft using the one or more ground-based thrust producing devices; and
maintaining the one or more ground-based thrust producing devices directed towards the VTOL aircraft and landing the VTOL aircraft at the pad.

8. The method of claim 7, further comprising reducing an output of the one or more ground-based thrust producing devices as the VTOL aircraft approaches the pad.

9. The method of claim 7, further comprising activating one or more thrust producing devices on the VTOL aircraft and elevating the VTOL aircraft using the one or more thrust producing devices on the VTOL aircraft and one or more ground-based thrust producing devices.

10. The method of claim 1, further comprising:
calculating a thrust to elevate the VTOL aircraft from the pad;
activating the one or more ground-based thrust producing devices and elevating the VTOL aircraft above the pad;
tracking the position of the VTOL aircraft as it moves from the pad; and
adjusting the output and orientation of the one or more ground-based thrust producing devices to maintain the VTOL aircraft elevated as it moves away from the pad.

11. The method of claim 10, further comprising determining that the VTOL aircraft has moved beyond an envelope and deactivating the one or more ground-based thrust producing devices.

12. The method of claim 10, further comprising controlling a thrust producing device on the VTOL aircraft and producing an upward force on the VTOL aircraft concurrently with the thrust of the one or more ground-based thrust producing devices.

13. A method of controlling a VTOL aircraft, the method comprising:
calculating a thrust to elevate the VTOL aircraft from a pad;
activating and controlling one or more ground-based thrust producing devices and one or more thrust producing devices on the VTOL aircraft and elevating the VTOL aircraft;
tracking the position of the VTOL aircraft as it moves from the pad;
adjusting the output and orientation of at least the one or more ground-based thrust producing devices to maintain the VTOL aircraft elevated as it moves away from the pad; and
determining that the VTOL aircraft has moved beyond an envelope of the pad and transferring control of the VTOL thrust producing devices to the VTOL aircraft.

* * * * *